US000001489H

United States Statutory Invention Registration [19]

[11] Reg. Number: H1489

Doan et al.

[43] Published: Sep. 5, 1995

[54] SYSTEM FOR PERFORMING A PLURALITY OF MEASUREMENTS

[75] Inventors: Tien D. Doan, Peoria; Durwin D. Nigus, Chillicothe, both of Ill.

[73] Assignee: Caterpillar Inc., Del.

[21] Appl. No.: 43,197

[22] Filed: Apr. 5, 1993

[51] Int. Cl.[6] ..... G05B 23/02

[52] U.S. Cl. ..... 364/550; 364/579; 364/580; 371/16.2; 324/73.1

[58] Field of Search ..... 324/73.1; 364/559, 578, 364/579, 580; 371/16.2

[56] References Cited

U.S. PATENT DOCUMENTS

| | | | |
|---|---|---|---|
| 2,950,437 | 8/1960 | Stahl | 324/73.1 |
| 4,118,772 | 10/1978 | Takada | 364/187 |
| 4,342,957 | 8/1982 | Russell | 324/725 |
| 4,758,780 | 7/1988 | Coon et al. | 324/73.1 |
| 4,916,641 | 4/1990 | Bybee | 364/550 |
| 5,083,117 | 1/1992 | Hoigaard | 340/649 |

OTHER PUBLICATIONS

Industrial and Process Control/Monitoring With an IBM PC/XT/AT, IBM PS/2, Micro-Channel VME--Bus or Microvax, 1990, pp. 208 thru 210.

*Primary Examiner*—Bernarr E. Gregory
*Attorney, Agent, or Firm*—David M. Masterson

[57] ABSTRACT

A system is disclosed that performs a plurality of measurements based on a set of preprogrammed instructions. The system includes a central processing unit (CPU) that has an internal primary and expansion bus. The internal primary bus includes a program memory and the internal expansion bus includes an I/O memory. The set of preprogrammed instructions resides in the program memory and defines a predetermined type of measurement. A standard bus couples the internal primary bus to one or more standard external devices, while a custom bus couples the internal expansion bus to one or more custom external devices. The custom bus includes an analog bus that provides for analog signal transmission to one or more custom external devices. At least one of the custom external devices receives a test signal, conditions the test signal and delivers data representing the conditioned test signal to the I/O memory. The CPU receives the test data from the I/O memory, computes a measurement value based on the preprogrammed set of instructions and responsively produces measurement data having a magnitude representing the computed value.

14 Claims, 15 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYSTEM FOR PERFORMING A PLURALITY OF MEASUREMENTS

TECHNICAL FIELD

This invention relates generally to a measurement system, and more particularly to a measurement system for performing a plurality of measurements based on a set of preprogrammed instructions.

BACKGROUND ART

Typically, measurement systems are designed and built to perform a specific type of measurement for specific application. Consequently, test engineers who test many applications typically possess many types of measurement systems, each for measuring a different type of testing parameter. The cost of owning and maintaining the many types of measurement systems is very costly. Additionally, since not all measurement systems have the same or similar user interface, the testing engineer must become familiar with each user interface which adds time to the overall test.

Many of these measurement systems include much of the same electronic circuitry. However, many of measurement systems use analog circuitry, which produces inaccurate measurements when the testing parameters rapidly change. What is needed is a measurement system that utilizes digital circuitry to perform the many types of measurements; thereby reducing testing cost and time.

The present invention is directed to overcoming one or more of the problems as set forth above.

DISCLOSURE OF THE INVENTION

In one aspect of the present invention, a system performs a plurality of measurements based on a set of preprogrammed instructions. The system includes a central processing unit (CPU) that has an internal primary and expansion bus. The internal primary bus includes a program memory and the internal expansion bus includes an I/O memory. The set of preprogrammed instructions resides in the program memory and defines a predetermined type of measurement. A standard bus couples the internal primary bus to one or more standard external devices, while a custom bus couples the internal expansion bus to one or more custom external devices. The custom bus also includes an analog bus that provides for analog signal transmission to one or more custom external devices. At least one of the custom external devices receives a test signal, conditions the test signal and delivers data representing the conditioned test signal to the I/O memory. The CPU receives the test data from the I/O memory, computes a measurement value based on the preprogrammed set of instructions and responsively produces measurement data having a magnitude representing the computed value.

BRIEF DESCRIPTION OF THE DRAWINGS

For a better understanding of the present invention, reference may be made to the accompanying drawings in which.

BEST MODE FOR CARRYING OUT THE INVENTION

Figure 1:
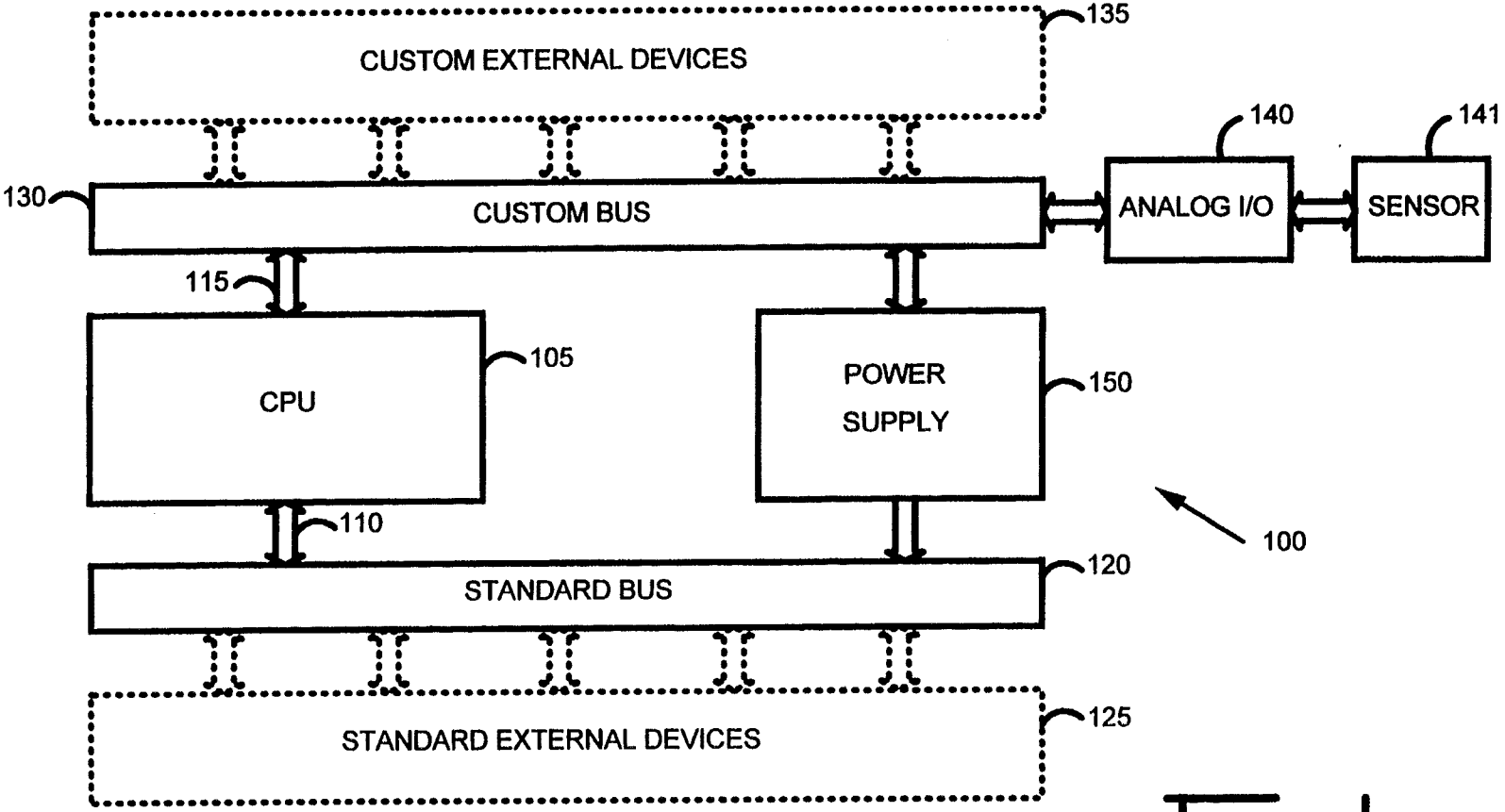
FIG. 1 is a functional block diagram of the present invention including a CPU, custom bus, and custom external devices.

As shown in FIG. 1, the present invention provides a system 100 that performs a plurality of measurements based on a set of preprogrammed instructions. The system 100 includes a central processing unit (CPU) 105 having an internal primary bus 110 and internal expansion bus 115. A standard bus 120 couples the internal primary bus 110 to one or more standard external devices 125.

One example of a standard bus 120 is a Versa Module Europe (VME) bus that provides access to such standard external devices as, disk drives, networking cards, graphics cards, additional processors, printer ports, analog to digital converters (A/D), digital to analog converters (D/A), counter/timers, and/or extended memory.

A custom bus 130 couples the internal expansion bus 115 to one or more custom external devices 135. An analog input/output (I/O) connector 140 is linked to the custom bus 130. Advantageously, the custom bus 130 includes an analog bus that provides for analog signal transmission to one or more custom external devices 135.

A system power supply 150 is connected to both the standard and custom bus to provide power to the CPU and external devices.

The analog I/O connector 140 is typically connected to a sensor 141 that is adapted to sense a parameter of a test object. The sensor produces a test signal representative of the sensed parameter. For example, the sensor may produce analog or pulse width modulated (PWM) signals that represent temperatures, pressures, rotations, etc. The test signal is delivered via the I/O connector 140 to the custom bus 130. The custom bus 130 delivers the test signal to a custom external device for subsequent signal conditioning.

The CPU 105 receives test data representative of the test signal and computes a measurement value based on the preprogrammed set of instructions. Responsively, the CPU 105 produces measurement data representative of the computed value. The measurement data may then be be stored for future analysis or displayed in real time.

Figure 2:
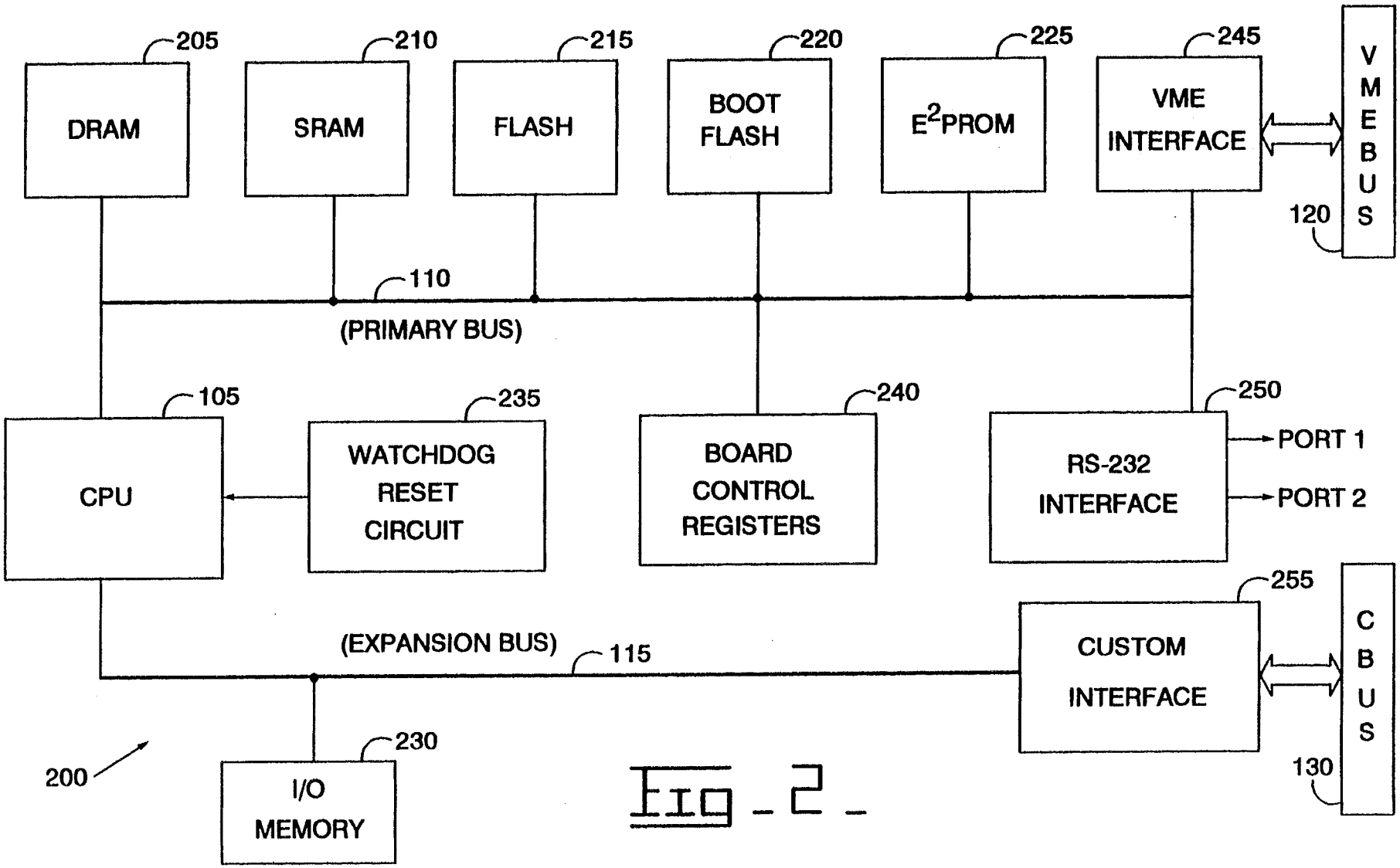
FIG. 2 is a functional block diagram of the CPU and associated circuitry.

The CPU 105 and its related circuitry 200 will now be discussed with reference to FIG. 2. For example, the CPU 105 includes a digital signal processor (DSP). One suitable DSP is available from Texas Instruments of Dallas, Tex. as model no. TMS320C30. In the preferred embodiment, a real-time operating system (OS) provides the working environment for the CPU. One suitable OS is the SPOX-OS Real Time Operating System available from Spectron Microsystems of Santa Barbara, Calif.

The CPU includes several types of memory to store software programs, parameters, etc. Listed below are the several types of memory, listed below along with the main use of each type of memory.

The primary bus 110 includes:

| | |
|---|---|
| DRAM 205 (1024K) | Processor "stack" Dynamic Allocation Heap, Temporary File Storage, Scratch-pad memory; |
| SRAM 210 (256K) | Zero-Wait-State run-time access for the executable program; |
| FLASH 215 (256K) | Permanent storage memory for the set of preprogrammed instructions; |
| BOOT FLASH 220 (128K) | Bootup routine and executable storage; |
| $E^2$PROM 225 (32K) | System status registers, RAM-based disk; |
| The expansion bus 115 includes: | |
| SRAM 230 (8K) | Input/Output (I/O) memory for the custom external devices; |

The CPU includes an on-chip Direct Memory Access (DMA) controller that reduces the need for the CPU to perform general I/O functions. Thus, the DMA can perform I/O operations without interfering with the operation of the CPU. Therefore, the DMA can control data flow from the custom external devices 135 to the I/O memory 230 via the expansion bus 115, while the CPU can access the various memories 205–225 via the primary bus 110 without reducing the computational throughput of the CPU. The DMA can read from and write to any location in the I/O memory map.

The CPU circuitry 200 also includes a watchdog reset circuit 235. The watchdog circuit 235 performs two functions:

1. The watchdog monitors the power supply, and resets the CPU in the event that the power supply produces an abnormal voltage level.

2. The watchdog receives periodic signals from the CPU. If, for example, the watchdog does not receive a signal after a predetermined time period, the watchdog resets the CPU. This function monitors CPU failure.

Board control registers 240 are also included. The board control registers 240 control "bit-levels" for several of the CPU circuitry functions, e.g. interrupt routing, general-purpose I/O data direction control and watchdog circuit control. For example, the board control registers 240 are similar to that are manufactured by Intel as product number 82C55.

The CPU circuitry 200 also includes interface circuitry to interconnect the internal buses of the CPU to the external buses. For example, a VME interface circuit 245 is provided to interconnect the primary bus 110 to the VME bus 120. One suitable VME interface circuit is manufactured by Cypress of San Jose, Calif. as model no. VIC068. A serial interface circuit 250 is provided to interconnect the primary bus 110 to a 2-channel RS-232 serial port. One suitable serial interface circuit is manufactured by Zilog of Campbell, Calif. as model no. Z85C30.

Figure 3:
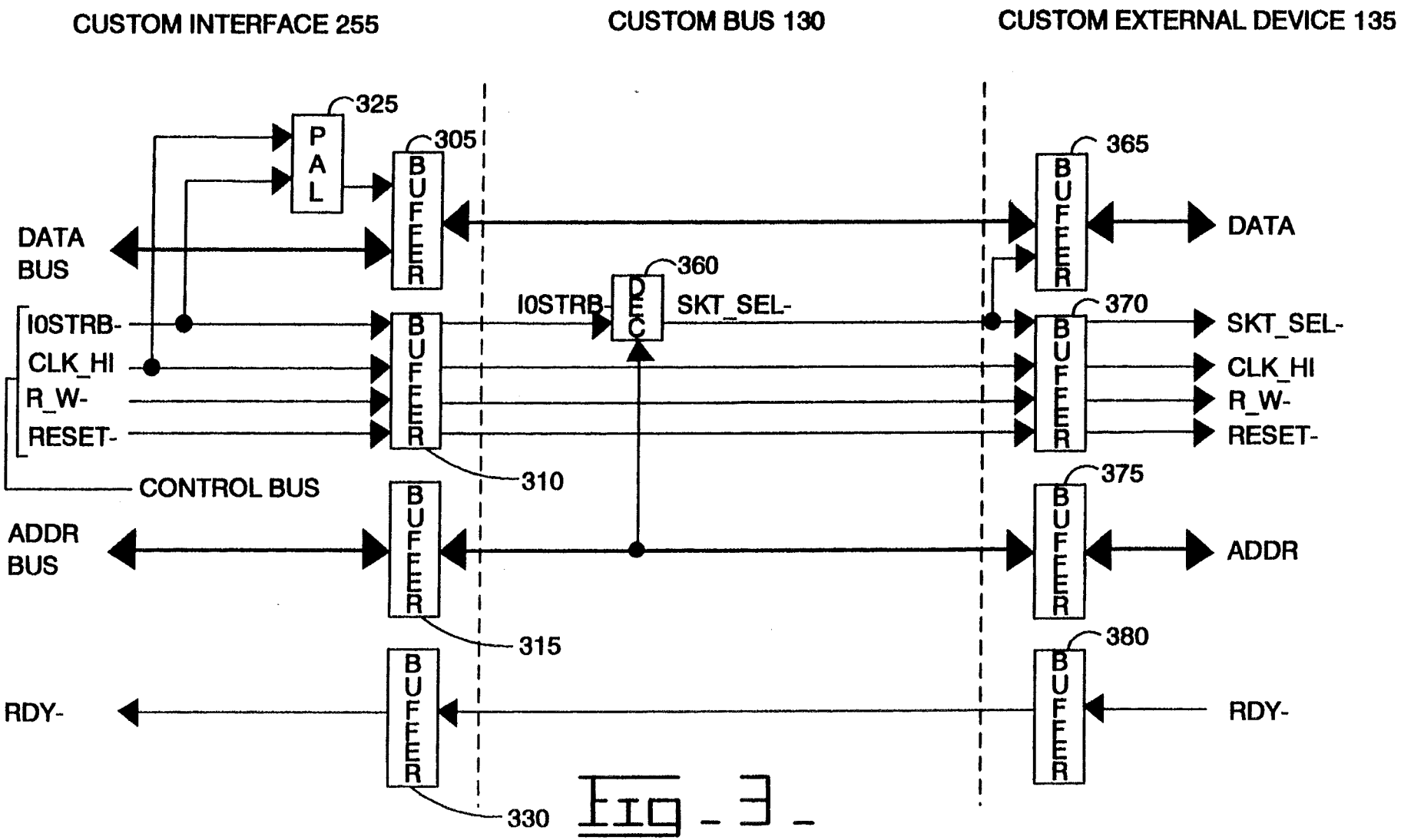
FIG. 3 is a functional block diagram of a custom interface circuit associated with the present invention.

Finally, a custom interface circuit 255 is provided to interconnect the expansion bus 115 to the custom bus 130 and is shown in greater detail in the block diagram of FIG. 3. The custom interface circuit 255 includes a buffer (305,310,315) for each of the data, control and address buses of the expansion bus 115 to provide electrical isolation. For example, the data buffer 305 is similar to that manufactured by as model no. 74ALS245, while the control and address buffers 310,315 are similar to model no. 74F244. The circuit 255 also includes a Programmable Array Logic (PAL) 325 to provide access timing to the data bus. For example, the PAL 325 controls data bus access in a well known manner and is similar to that manufactured by Texas Instruments as model no. 16L8.

As shown a ready signal is buffered by a buffer 330 similar to that of the address and control buffers.

The following is a description of the control signals:

IOSTRB-

The IOSTRB- signal is a data strobe signal that is active (low) and is produced by the CPU. When the IOSTRB is active, a read or write access to a custom external device is in progress.

CLK_HI

The CLK_HI signal is a timing signal produced by the CPU clock (freq=16 Mhz).

R_W-

The R_W- signal is produced by the CPU and that represents the directional flow of data. A R_W- (high) indicates that data is being read from a custom external device, while a R_W- (low) indicates that data is being written to a custom external device.

RESET-

The RESET- signal is active (low) and indicates that the CPU has been reset.

RDY-

The RDY- signal is active (low) and is produced by a custom external device in response to the access cycle being complete.

SKT_SLT-

The SKT_SLT signal is active (low) and is produced by the CPU via the IO_STRB signal to access a specific custom external device 135.

The custom bus 130 includes an address decoder 360 that receives address signals and the IO_STRB signal and produces the SKT_SEL signal. One suitable address decoder is manufactured by Texas Instruments as model no. 74AS138.

Additionally, each custom external device 135 includes bus buffers 365,370,375,380 to provide for electrical isolation and are similar to those utilized by the custom interface circuitry 255.

Figure 4:
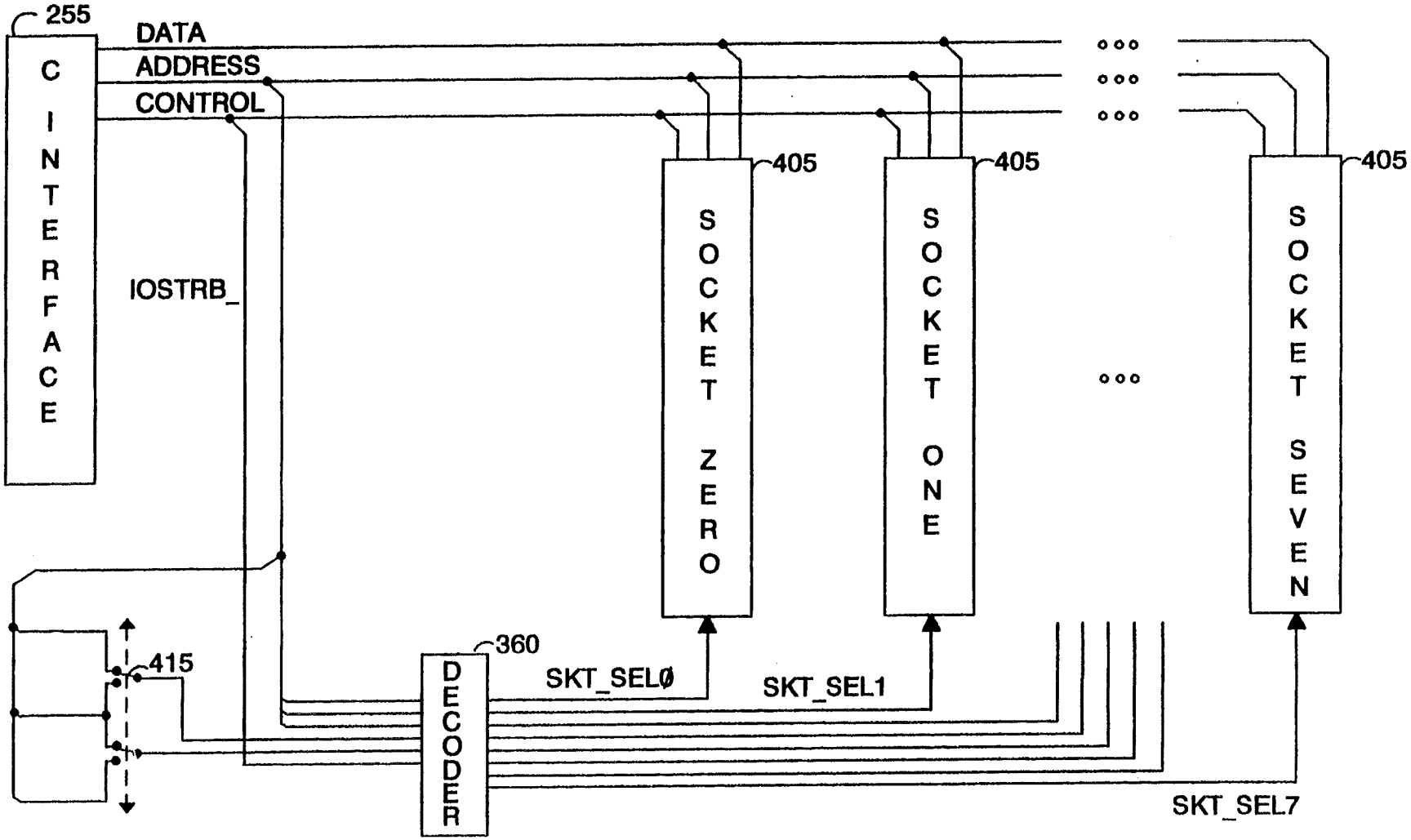
FIG. 4 is a functional block diagram of the custom bus.

With reference to FIG. 4, the custom bus 130 includes a plurality of sockets 405 for receiving the custom external devices 135. As shown eight sockets 405 are available to be accessed. Each socket is mapped into a predetermined memory space in the I/O memory 230. The memory space is decoded for each socket 405 to providing for the CPU to communicate to a specific socket.

The custom bus 115 includes a 16-bit data bus and a 13-bit address bus. Of the thirteen available address lines, lines 8–12 are used as the socket identifier address, while the remaining eight address lines (lines 0–7) are used for register addressing. The address decoder 360 receives signals ADDR8-ADDR12 and the IOSTRB-signal, and produces the SKT_SEL- signal to access a specific socket.

Further, eight additional sockets can be accessed. A two-pole, double-throw switch 415 is provided to give selectable access to sockets 0–7 or sockets 8–15.

Now a discussion will be directed toward the custom external devices 135. The circuitry of a custom external device 135 resides on a PC-board (card), which is "plugged" into a socket 405 of the custom bus 130. For example, a block diagram of the circuitry for a "generic" custom external card 500 is shown on FIG. 5. A 96-pin DIN connector 505 is adapted to connect the card 500 to a socket 405 of the custom bus 130. Accordingly, the connector 505 includes an address bus, control bus, data bus, analog bus, as well as, interrupt (INT) and ready (RDY) lines.

The address buffer 375, control buffer 370 and data buffer 365 are provided to protect the respective buses from static electricity. The data buffer 365 is capable of being enabled/disabled and is controlled by the SKT_SEL and R_W signals.

A peripheral control circuit 525 decodes the address signals to enable a peripheral device 530. For example, the peripheral device 530 receives data from the data bus after the unique address of the respective socket 405 appears on the address bus and a write signal is delivered to the peripheral control circuit 525. The peripheral device 530 delivers data to the data bus after the unique address of the respective socket 405 appears on the address bus and a read signal is delivered to the peripheral control circuit 525.

The peripheral control circuit 525 includes two Programmable Array Logic (PAL) circuits. For example, a 16L8 PAL made by Texas Instruments generates peripheral control signals to enable the peripheral device, while a 16R4 PAL made by Texas Instruments is configured as a low complexity fixed-time wait-state generator.

Local control circuitry 535 provides for interrupt signal generation. The local control circuitry 535 includes a 74F138 interrupt multiplexer made by Texas Instruments, which is preprogrammed to select one of four interrupt lines on the interrupt bus for interrupt signal transmission. During an initialization stage, a 82C55A parallel peripheral interface circuit made by Intel assigns a predetermined interrupt line to the interrupt multiplexer. Once the peripheral device 530 requests an interrupt, an interrupt signal is generated via the selected interrupt line.

Figure 6:
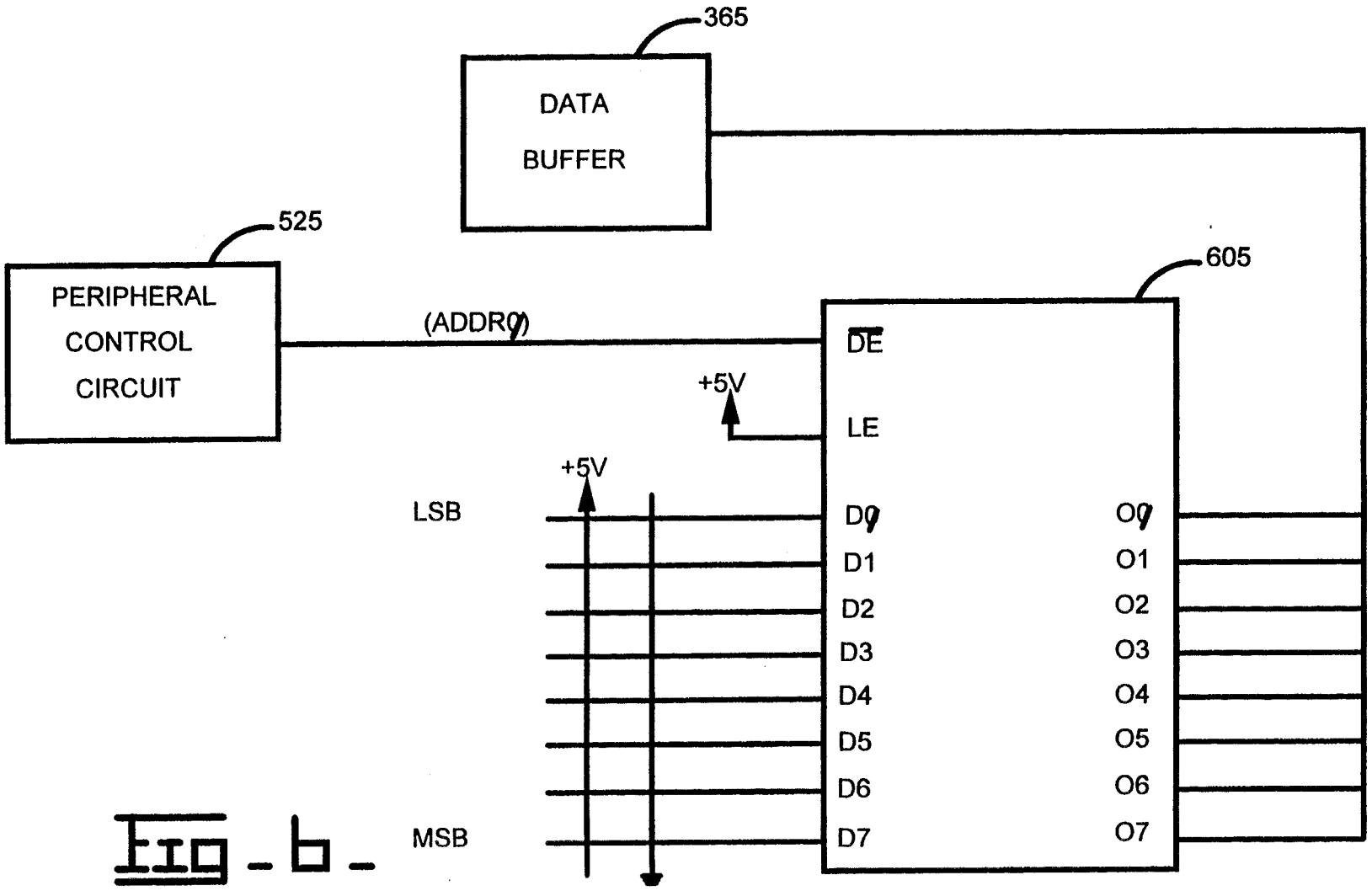
FIG. 6 is a functional block diagram of an ID register associated with the present invention.

The local control circuitry 535 may include an ID register 605, which is discussed with reference to FIG. 6. The contents of the ID register 605 contains a predetermined 8-bit number that represents the specific type of the custom external device 135. Each type of custom external device 135 has a unique 8-bit number. The ID number is made available to the buffered data bus through a 74LS373 octal transparent buffer made by Texas Instruments. The contents of the ID register 605 is accessed by a predetermined register address (ADDR0). The ID number is selected by tying selected data lines (D0–D7) to one of +5V and GND. To conserve board space however, the parallel peripheral interface circuit may instead store the board ID number.

Figure 5:
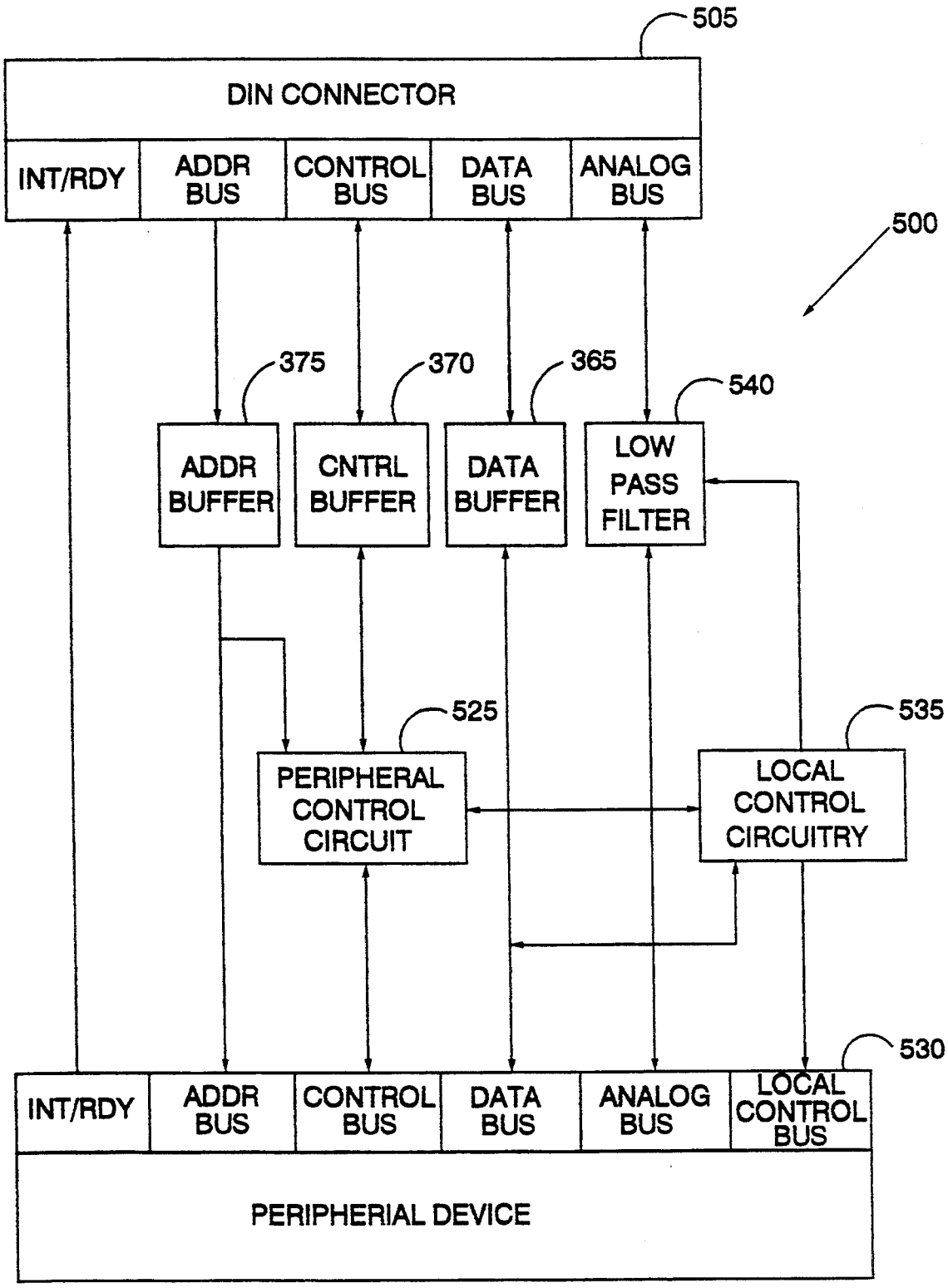
FIG. 5 is a functional block diagram of a generic custom external device.

As shown in FIG. 5, a low pass filter 540 may be provided to filter a test signal transmitted on the analog bus.

Figure 7:
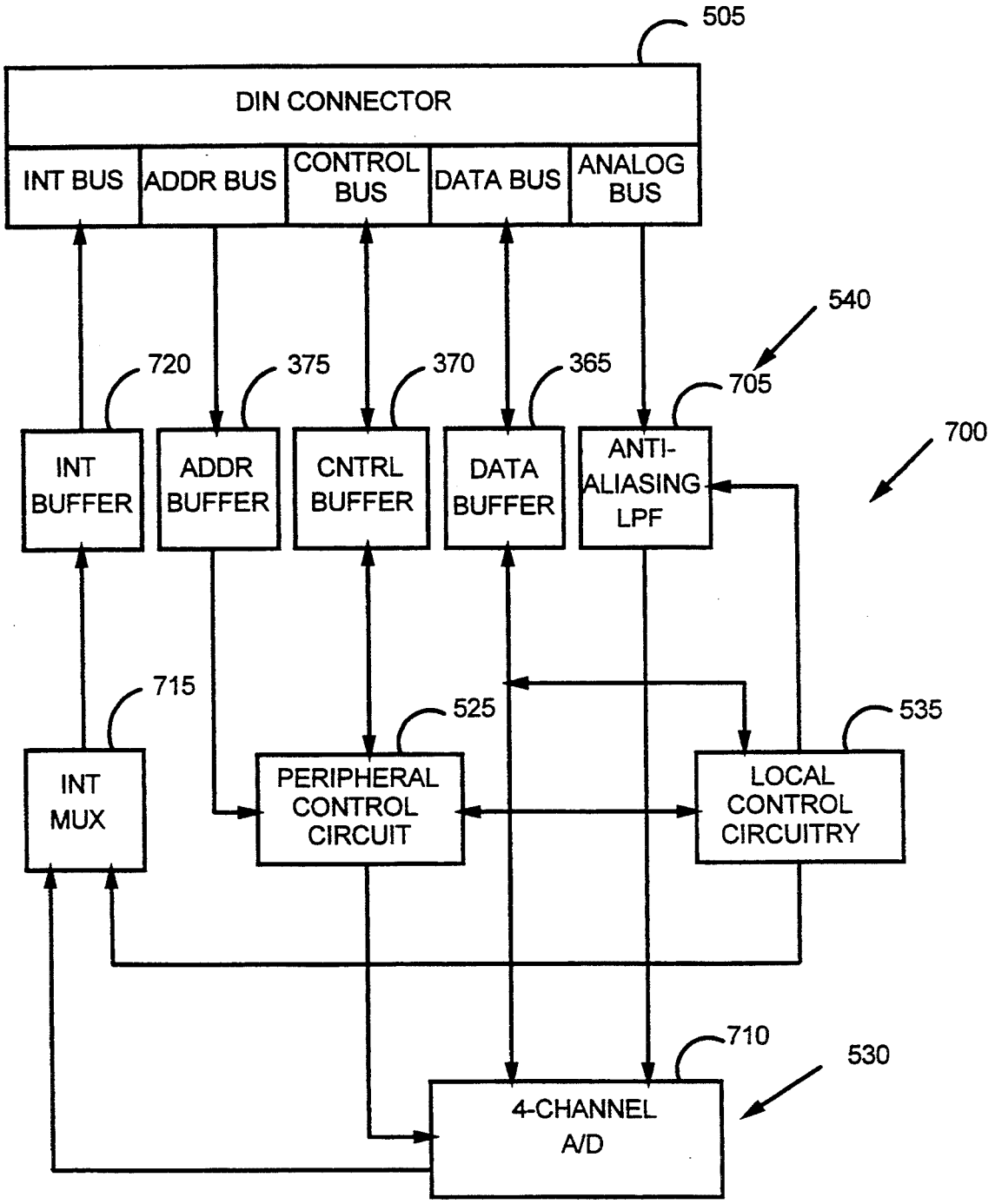
FIG. 7 is a functional block diagram of an Analog to Digital converting custom external device.

The specific types of custom external devices 135 will now be discussed, commencing with a block diagram of a multi-channel Analog to Digital (A/D) converting device 700 shown in FIG. 7. The A/D converting device 700 converts a test signal having an analog waveform into representative digital values.

For example, an anti-aliasing filter 705 filters the analog test signal and delivers the filtered test signal to an A/D converter 710. Preferably, the anti-aliasing filter 705 includes four cutoff frequencies—20 KHz, 5 KHz, 1 KHz, and 0.1 KHz, which are selectable in software. One suitable anti-aliasing filter configuration may include circuitry comprising operational amplifiers. For example, the operational amplifiers may be manufactured by Analog Devices as model no. AD713 and configured in a well known manner. The A/D converter 710 receives the filtered test signal, converts the test signal into a digital signal, i.e. a multi-bit digital word, and stores the digital word in a data buffer. The digital test data is stored in the data buffer until the CPU is ready to read the digital test data. One suitable A/D converter is a 14-bit converter manufactured by Analog Devices as model no. AD1779.

Figure 8:
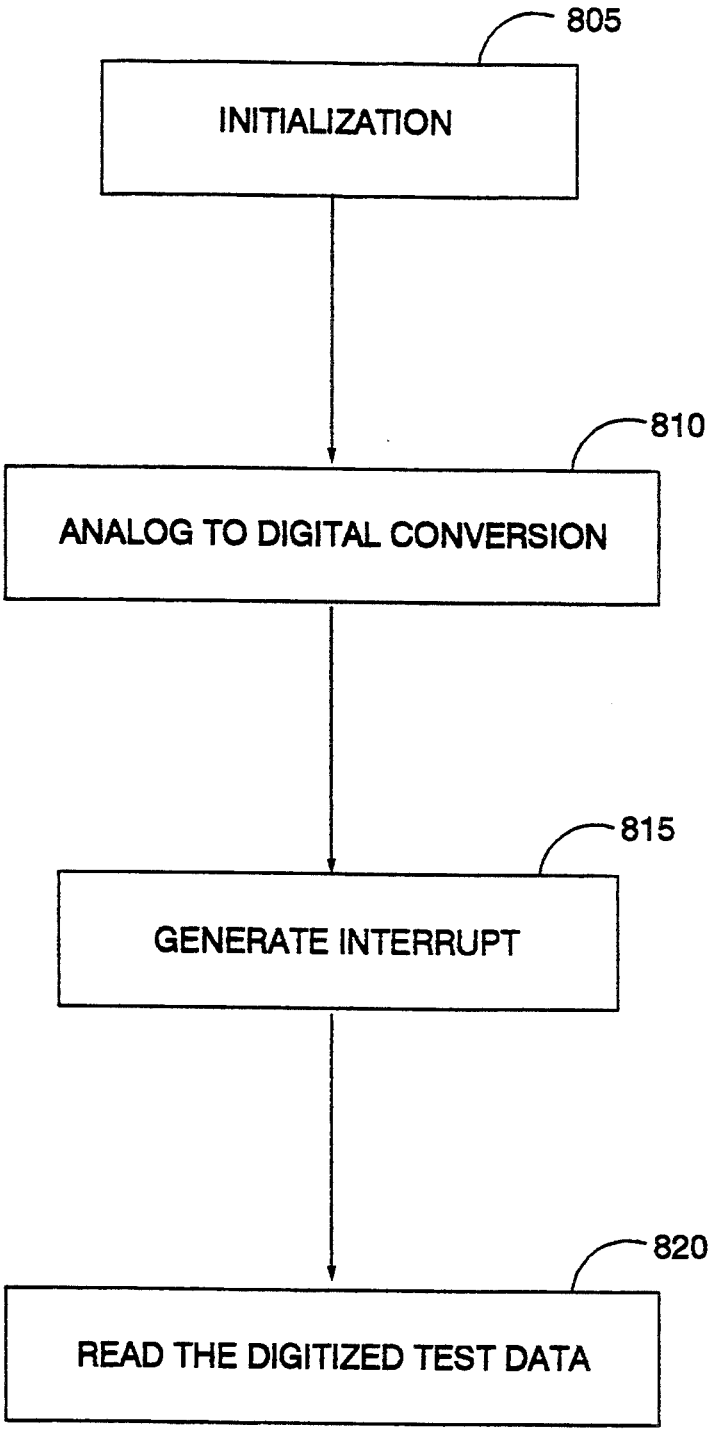
FIG. 8 is a flowchart of the software control of the Analog to Digital converting custom external device.

The following discussion refers to FIG. 8, which is a flowchart illustrating the software control of the A/D converting device 700. An initialization step begins at block 805. For example, the ID number of the A/D device is read and recorded in the I/O memory 230 at the address location associated with the particular socket 405. Further, the number of A/D channels and the cutoff frequency of the anti-aliasing filter 705 are set.

At block 810, the Analog to Digital conversion process is commenced. Advantageously, the present invention provides for several conversion techniques.

1. A first conversion technique utilizes the CPU internal timer. The internal timer is set to produce a timing signal with a predetermined time period. The timing signal is used to control the sampling or conversion rate of the A/D converter 710. For example with each new period of the timing signal, a conversion begins. This technique allows for a constant sample rate and for simultaneous sampling of all the A/D channels.

2. A second conversion technique provides for the DMA to control the sampling rate. For example, the DMA initiates a read signal for each channel to receive prior test data from each data buffer on the A/D converter 710. Then, the DMA can execute a subsequent read signal to commence the next Analog to Digital conversion. Since a conversion may begin immediately after reading the test data, the sampling rate is maximized.

3. A third conversion technique provides for the conversion to be controlled by a write signal. For example, the DMA initiates a read signal for each channel to receive the prior test data from each data buffer on the A/D converter 710 similar to the second technique. However, the CPU can then execute a write signal, which starts the next Analog to Digital conversion. This technique is also useful for infrequent sampling rates.

After a conversion is completed, control then passes to block 815. At block 815 an interrupt is generated to inform the CPU that the conversion is complete. Adverting back to FIG. 7, the local control circuitry 535 generates an interrupt signal via an interrupt multiplexer 715. As shown, the interrupt signal is buffered by an interrupt buffer 720. For example, the interrupt buffer 720 may be similar to that manufactured by Texas Instruments as model no. 74ALS1035.

Referring again to FIG. 8 at block 820, the test data is then read once the interrupt is received by the CPU. For example, the test data is transferred from the data buffers corresponding to each channel to the I/O memory 230. Note that the 14-bit digital words are converted into 32-bit digital words in the software.

Figure 9:
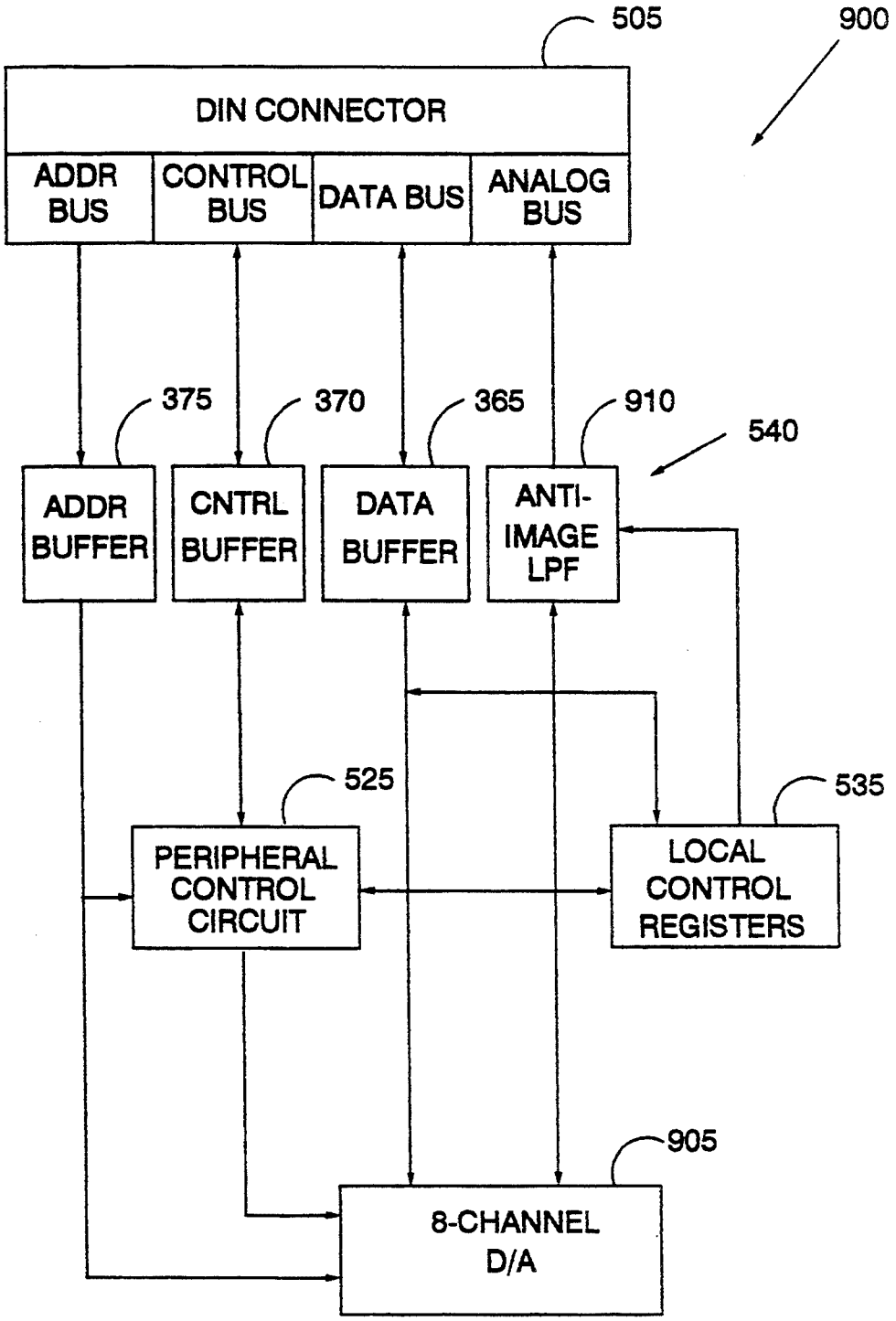
FIG. 9 is a functional block diagram of a Digital to Analog converting custom external device.

With reference to FIG. 9 a block diagram of a multichannel Digital to Analog (D/A) converting device 900 is shown. Each channel includes a D/A converter 905. Digital data is delivered via the data bus to a D/A data buffer associated with the D/A converter 905. The buffered data is then delivered to the D/A converter 905, which converts the buffered data to an analog signal. For example, Analog Devices manufactures a suitable 12-bit D/A converter as model no. AD664.

The converted signal is filtered by an anti-image filter 910 that has selectable frequencies of 20 KHz, 5 KHz, 1 KHz, and 0.1 KHz. The anti-image filter may include operational amplifiers that are configured in a well known manner. The filtered analog signal is then transmitted to the analog bus.

Figure 10:
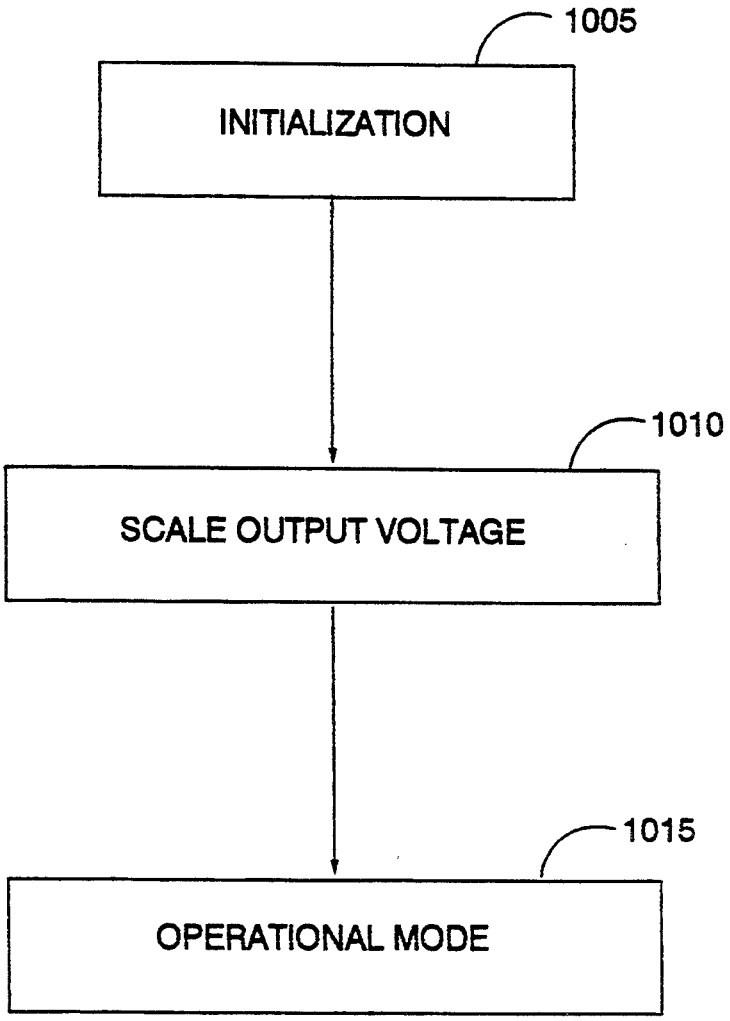
FIG. 10 is a flowchart of the software control of the Digital to Analog converting custom external device.

FIG. 10 shows a flowchart of the software control of the D/A converting device 800. An initialization step begins at block 1005. For example, the ID number of the D/A device 800 is read and recorded in the I/O memory 230. Further, the number of D/A channels and the cutoff frequency of the anti-image filter 810 are set. Selection of an output voltage scale is also included in the initialization, shown by block 1010. For example, the output voltage scale includes the following voltage scales: unipolar (0 to 10 volts), bipolar (−5 to +5 volts) or full scale bipolar (−10 to 10 volts).

Control then transfers to Block 1015, where an operational mode is set.

1. A first operational mode provides for all of the D/A channels to be updated simultaneously, i.e. the DMA writes digital data to each of the D/A data buffers of each channel in a simultaneous manner.

2. A second operational mode provides for the DMA to write digital data to each D/A data buffer of each channel individually and/or sequentially.

3. A third operational mode provides for each D/A channel to be updated according to a calibration procedure.

Once the operational mode is set, the D/A device 800 is ready to begin the signal conversion in the above described manner.

Figure 11:
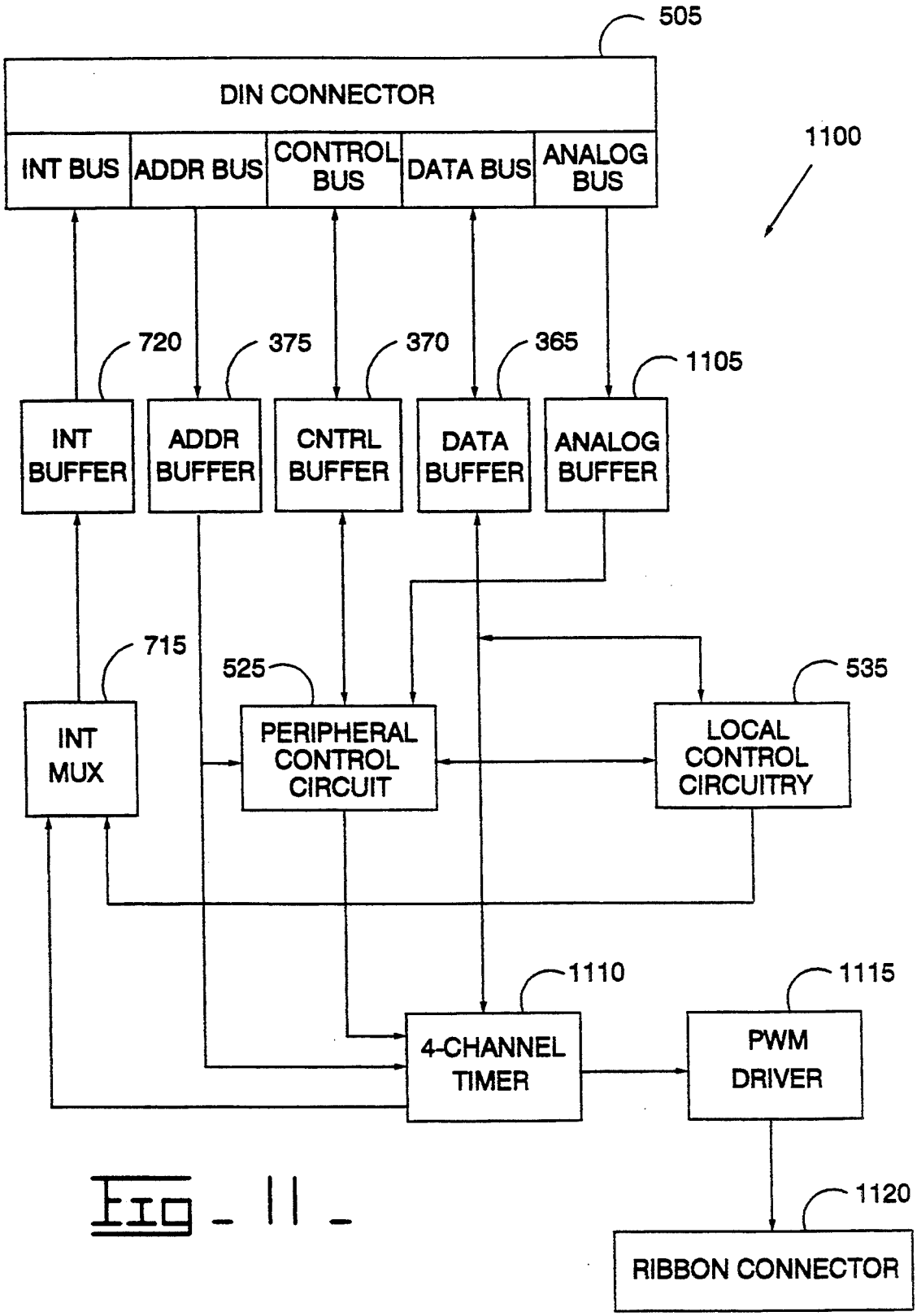
FIG. 11 is a functional block diagram of a timing custom external device.

Reference is now made to FIG. 11, where a block diagram of a multi-channel timing device 1100 is described. The timing device 1100 receives a periodic test signal from the analog bus via an analog buffer 1105. The buffered analog test signal is delivered to a timing device 1110. The timing device 1110 measures the period of the periodic signal, and produces a frequency signal having a value representative of the periodic signal period. For example, the analog buffer 1105 may purchased from National Semiconductor as product no. 74HC14, while the timing device 1110 may be purchased from Advanced Micro Devices as product no. AM9513A.

Figure 12:
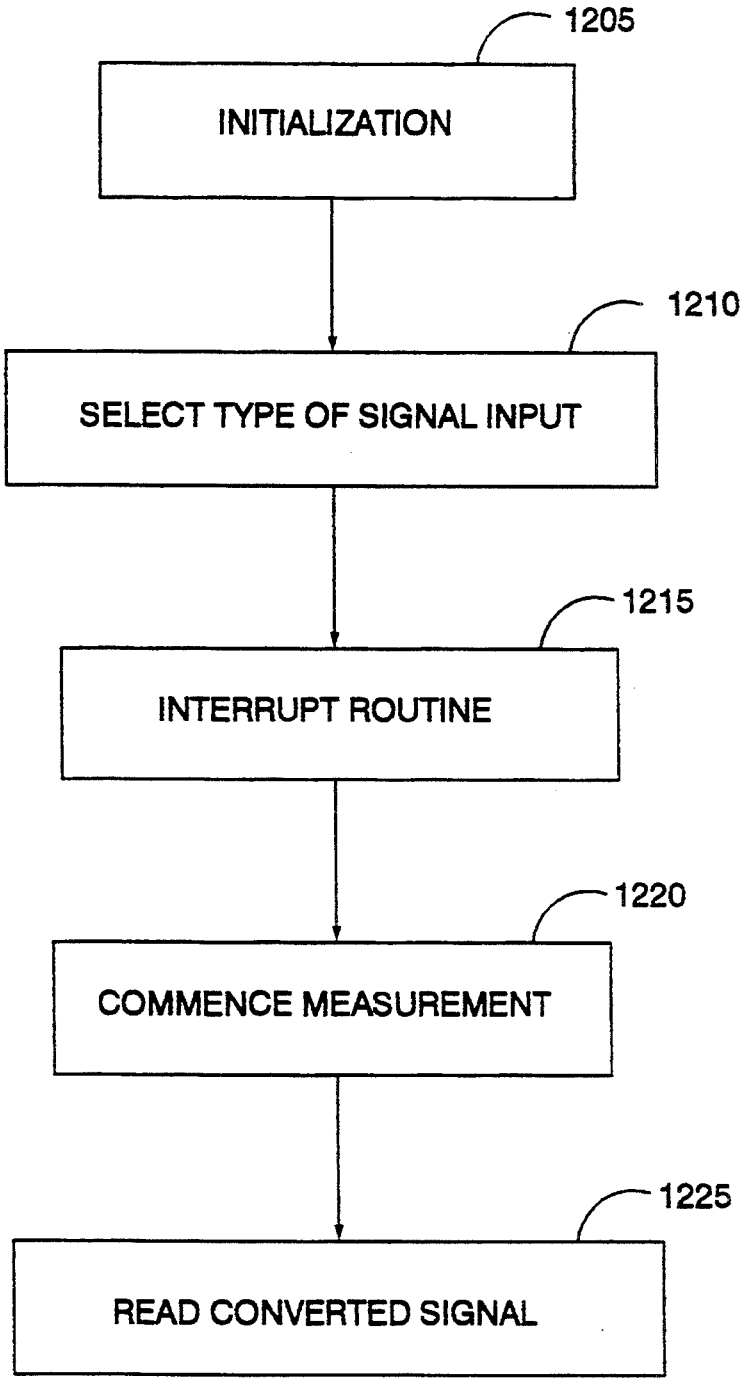
FIG. 12 is a flowchart of the software control of the timing custom external device.

The flowchart illustrated in FIG. 12 shows the software control of the multi-channel timing device 1110. An initialization step begins at block 1205. For example, the ID number of the timing device 1100 is read and recorded in the I/O memory 230. Further, the number of timing channels are selected. Next, control passes to block 1210 where the signal type of an input signal (periodic test signal) is entered. For example, the type of signal inputs may include: a slow frequency signal (less than 1 Hz), a fast frequency signal (greater than 1 MHz) or Pulse Width Modulated signal input. Once the type of test signal input is entered, control then proceeds to block 1215. At block 1215, a interrupt routine selects one of four available interrupt signals. The timer is now ready to start the measurement. At block 1220, the timer measures a period of the periodic test signal and produces the frequency signal. After each periodic measurement is complete, an interrupt is generated via the peripheral control circuit 525 to the CPU to begin reading the data represented by the frequency signal, which is represented by block 1225.

The timing device 1100 includes two methods to output the frequency signal. One method is provided via the data bus. The other method is provided via a PWM driver 1115. For example, it may be desirable to produce the frequency signal in PWM form. Accordingly, a ribbon connector 1120 is provided for PWM communication to the outside world. One suitable PWM driver is manufactured by Hewlett Packard as product no. 6N139.

Figure 13:
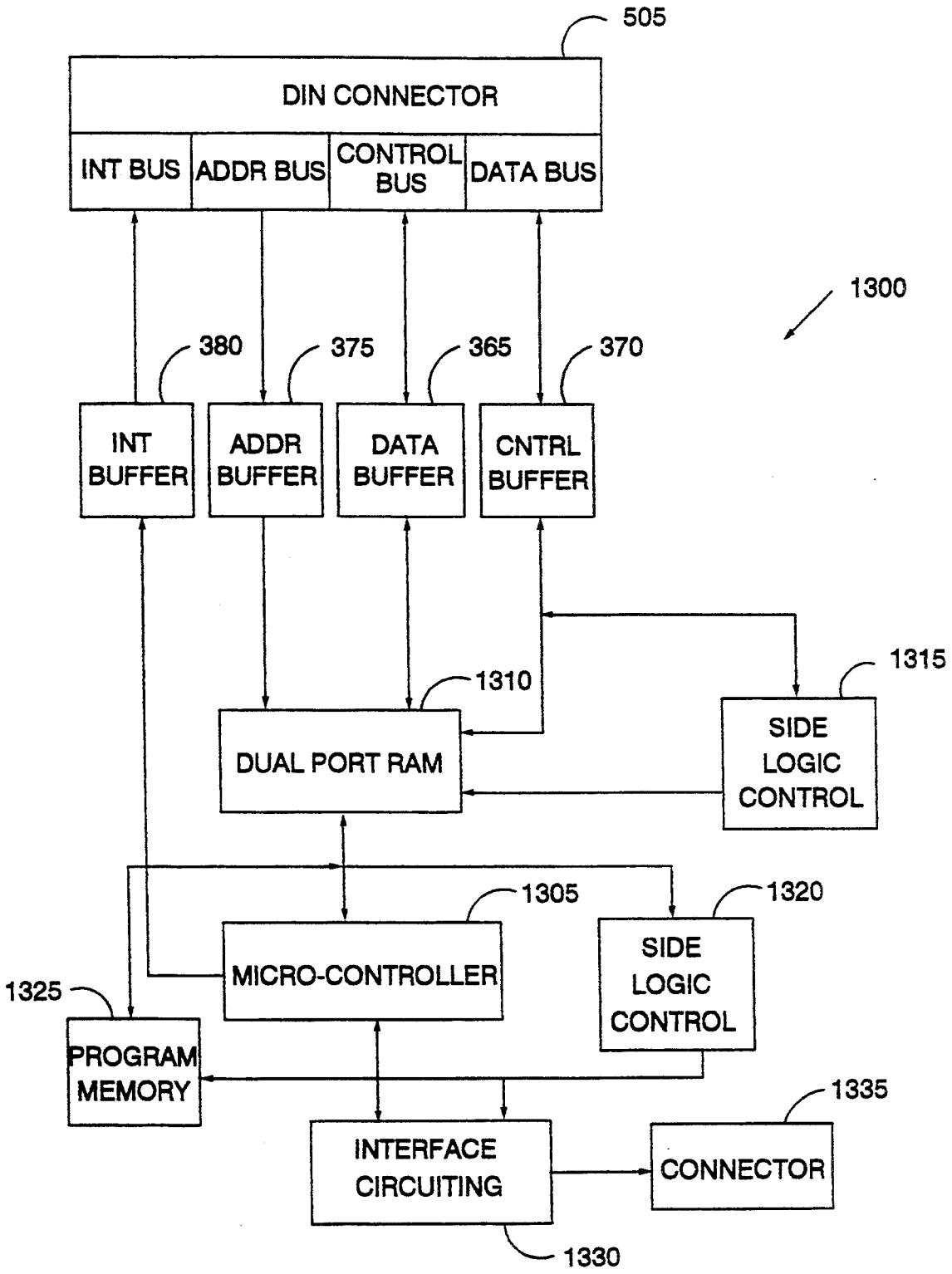
FIG. 13 is a functional block diagram of an operator I/O interfacing custom external device.
Figure 14:
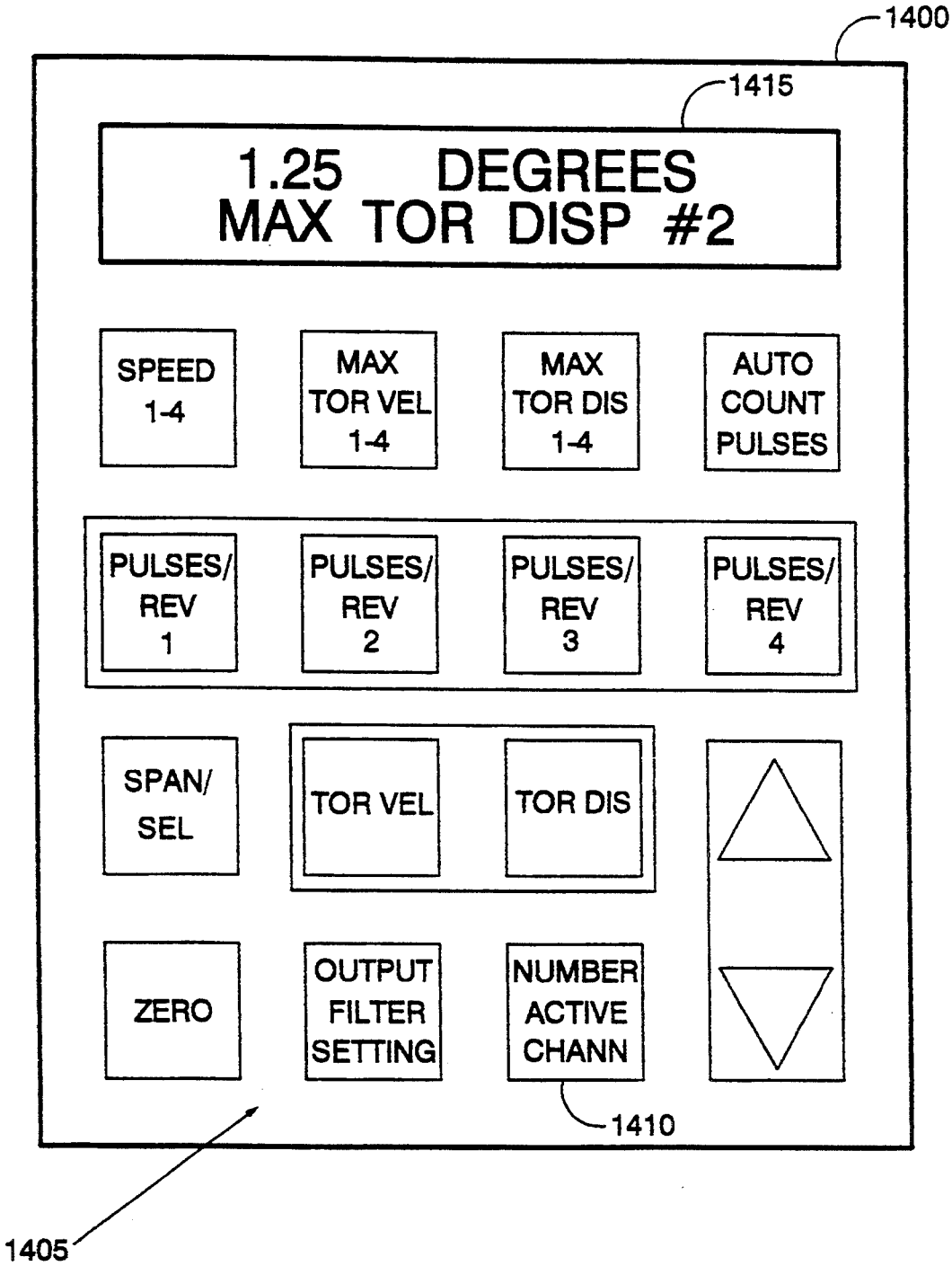
FIG. 14 is a representation of an operator I/O interface panel associated with the present invention.

Referring now to FIG. 13, a Input/Output (I/O) operator interface device 1300 is shown. The I/O operator interface device 1300 is designed to provide an electronic interface between a operator I/O panel and the CPU. The operator I/O panel will first be described with reference to FIG. 14.

The operator I/O panel 1400 includes a key pad 1405 having a plurality of membrane switches 1410 and a (2×16) character Liquid Crystal Display LCD 1415. Each switch 1410 may be programmed to perform a plurality of functions. The LCD 1415 provides alphanumeric descriptions of a measurement value. For example, the measurement values and key functions illustrated describe a torsiograph measurement system. However, it is apparent to those skilled in the art that the key functions can be programmed to provide many other types of functions, each specific to a predetermined testing or measurement application.

Referring again to FIG. 13, the I/O interface device 1300 will be described. The I/O interface device 1300 includes an 8-bit micro-controller 1305 provided by Motorola as part no. 68HC11. The 68HC11 communicates to the CPU via a dual port RAM 1310. For example, the dual port RAM is similar to that provided by Integrated Devices Technology as product no. IDT7130. Side logic control is provided by PAL circuitry 1315,1320 for the CPU and 68HC11, respectively. For example, PAL circuitry 1315,1320 may be provided by Texas Instruments as product no. 16R4 and 16L8, respectively. The 68HC11 includes program memory 1325 to provide software control of the operator I/O panel 1400. Key pad and LCD display interface circuitry 1330 is provided to establish communication between the 68HC11 and the operator I/O 1400 panel. Finally, a parallel connector 1335 is provided to interface the system to the outside world via digital communication.

It is noted that the block diagrams shown in the above FIGS. depict a complete working model of the present invention. The specific circuit configuration to carry-out the invention is a matter of design choice and is not critical to the present invention.

INDUSTRIAL APPLICABILITY

Figure 15:
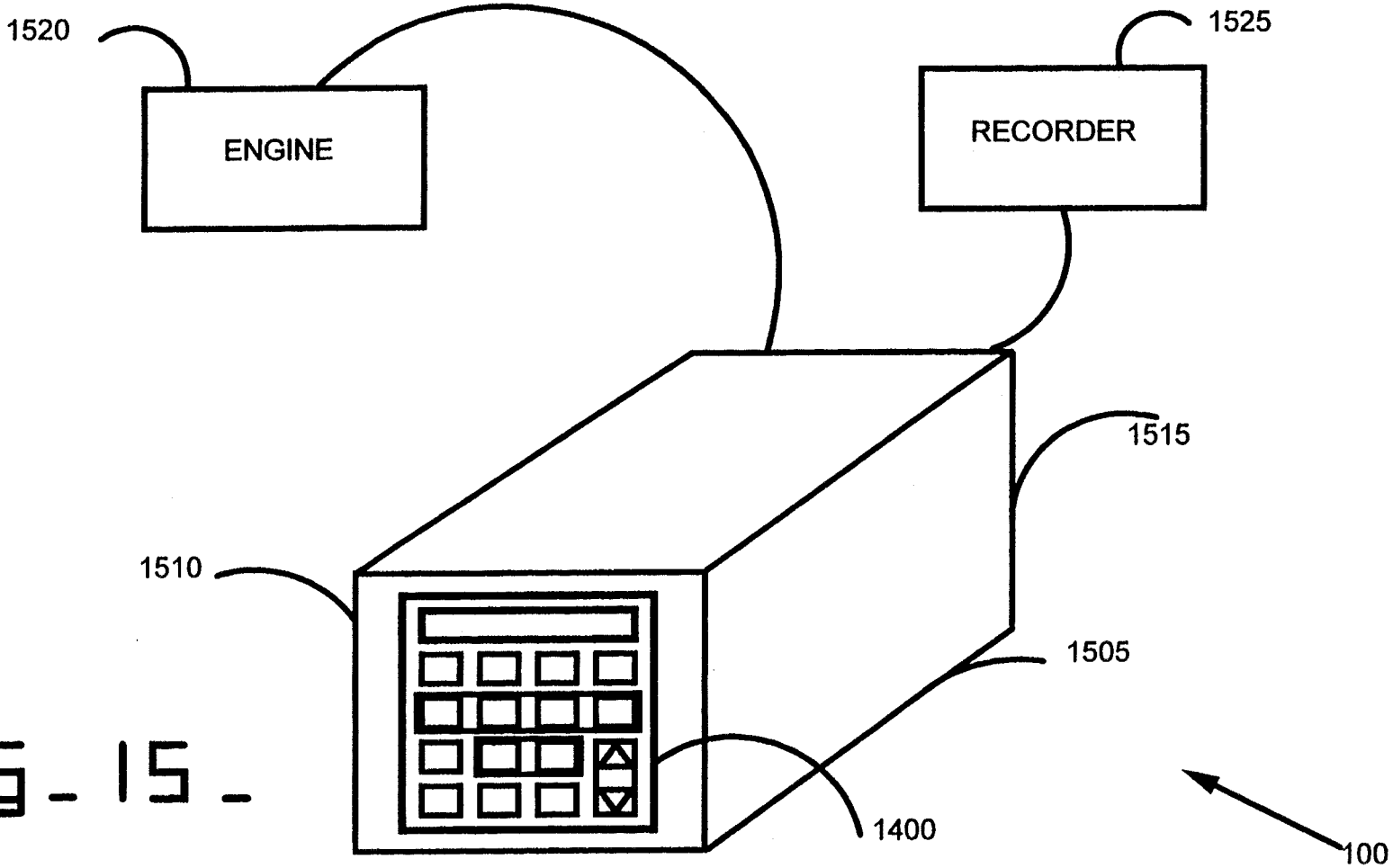
FIG. 15 is a block diagram of a torsional measuring system associated with the present invention.

An example of the present invention will now be described with reference to in FIG. 15. As shown, the system 100 is contained in a single enclosure 1505. The front panel 1510 of the enclosure 1505 includes the operator I/O panel 1400, while the rear panel 1515 includes electrical connections for input, output, and power. The present invention requires only one connection each analog input and output, thereby limiting the number of cables to provide for optimum portability and space requirements.

This discussion is directed towards measuring torsional vibrations on an engine 1520, e.g. a flywheel. Here, the set of preprogrammed instructions are designed to perform analysis relating to a torsional measurements. For example, the preprogrammed instructions may be similar to that represented by the flowchart shown FIG. 4 of application Ser. No. 08/002,557 filed on Jan. 11, 1993, assigned to Caterpillar Inc., which is hereby incorporated by reference, now U.S. Pat. No. 5,390,545.

Although torsional measurements are discussed, it is apparent that the preprogrammed instructions may be designed to perform other types of measurements or analysis, e.g. differential clutch speed measurements, engine combustion analyzers, flow meter linearizers, fuel nozzle discharges monitors, and many other types of analysis.

Initially, the operator enters set-up information via the key pad 1405. Once the set-up information is entered the measurement or analysis may begin. The system 100 receives a test signal representative of the rotational speed of the flywheel. More particularly, the test signal is delivered to the custom bus 130 via the connectors on the rear panel. The test signal is transmitted along the analog bus of the custom bus 130 to the timing device 1100. The timing device 1110 determines the period of the test signal and produces a frequency signal representative of the measured period.

The CPU receives data representing the measured period, performs calculations based on the set of preprogrammed instructions and produces measurement data having values representative of the torsional velocity and displacement. The measurement data is then delivered to the D/A device 900 where the digital data is converted into an analog signal. The analog signal is then delivered to the analog bus, where the signal is transmitted via the back panel 1515 to a strip chart recorder 1525.

Further, the operator can request via the key pad 1405 to display the maximum velocity or displacement on the LCD 1415. For example, as shown on FIG. 14 the maximum torsional displacement for channel #2 is 1.25°.

As described the present invention provides a measurement system that performs a plurality of measurements based on a set of preprogrammed instructions. Advantageously the present invention includes circuitry that is common to many types of test instruments to provide for testing flexibility. Further, the present invention provides a modular design approach where only the required number of custom external devices are added to the system to reduce system cost. However if the measurement system is to be utilized for a subsequent test or analysis, custom external devices can be added, along with modification to the software, to perform the new test without the need of purchasing another test instrument. Further the operator I/O panel 1400 remains the same to provide the operator with familiarity to the measurement system. Thus one system is provided to perform many types of measurements; thereby reducing the need for many test instruments. This provides for lower testing costs while improving testing efficiency.

Other aspects, objects and advantages of the present invention can be obtained from a study of the drawings, the disclosure and the appended claims.

We claim:

1. A system for performing a plurality of measurements based on a set of preprogrammed instructions, comprising:

a central processing unit having an internal primary and expansion bus, the internal primary bus including a program memory and the internal expansion bus including an input/output (I/O) memory, each bus including a separate data, address and control bus, the set of preprogrammed instructions residing in the program memory and defining a predetermined type of measurement;

a standard bus for coupling the internal primary bus to one or more standard external devices, the standard bus including a digital data, address and control bus;

a custom bus for coupling the internal expansion bus to one or more custom external devices, the custom bus comprising a digital data, address and control bus, and an analog bus that provides for analog signal transmission to one or more custom external devices a sensor for producing a test signal indicative of a sensed parameter of a test object, wherein the analog bus receives the test signal and delivers the test signal to a custom external device, the custom external device conditioning the test signal and delivering data representing the conditioned test signal via the custom digital data bus to the I/O memory; and wherein the central processing unit receives the test data from the I/O memory, computes a measurement value based on the preprogrammed set of instructions and responsively produces measurement data having a magnitude representing the computed value.

2. A system, as set forth in claim 1, including a transfer means for receiving the test data and storing the test data in the I/O memory, the central processing unit executing the preprogrammed set of instructions simultaneous to the storing of the test data in the I/O memory.

3. A system, as set forth in claim 2, wherein the custom bus includes a plurality of sockets for receiving the custom external devices, each socket having an address that occupies a portion of the I/O memory, and including means for assigning an ID number for each custom external device at the socket address, wherein the central processing unit receives the ID number and determines the type of custom external device that is disposed in each socket of the custom bus.

4. A system, as set forth in claim 3, wherein the central processing unit includes a digital signal processor.

5. A system, as set forth in claim 4, including an operator I/O panel having a key pad with a plurality of membrane switches and a multi-character Liquid Crystal Display (LCD), each switch being pre-programmed to perform one of a plurality of functions, wherein the LCD produces alpha-numeric descriptions of a measurement value.

6. A system, as set forth in claim 5, wherein the custom external device includes a multi-channel analog to digital (A/D) converting device, each channel including a A/D buffer and converter, the A/D converting device receiving the test signal from the analog bus, converting the test signal from an analog waveform into representative digital values, and storing the digitized test signal in the A/D data buffer.

7. A system, as set forth in claim 6, wherein the A/D converting device includes a low pass filter that selectively filters predetermined frequencies of the test signal.

8. A system, as set forth in claim 7, wherein the digital signal processor includes an internal timer that produces a timing signal having a predetermined period, the period of the timing signal controlling the sampling rate of the A/D converting device.

9. A system, as set forth in claim 7, wherein the digital signal processor includes direct memory access, the direct memory access controlling the sampling rate of the A/D converting device.

10. A system, as set forth in claim 6, wherein the custom external device includes a multi-channel digital to analog (D/A) converting device, each channel including a D/A data buffer and converter, the D/A device receiving the measurement data, converting the measurement data from digital values into a representative analog waveform and delivering the analog measurement data to the analog bus.

11. A system, as set forth in claim 10, wherein the D/A converting device includes a low pass filter that selectively filters predetermined frequencies of the analog measurement data.

12. A system, as set forth in claim 11, wherein the digital signal processor includes direct memory access, the digital signal processor delivering the measurement data to the I/O memory for storage and the direct memory access transferring stored measurement data from the I/O memory to each D/A data buffer simultaneously.

13. A system, as set forth in claim 11, wherein the digital signal processor means includes direct memory access, the digital signal processor delivers the measurement data to the I/O memory for storage and the direct memory access transfers the stored measurement data from the I/O memory to each D/A data buffer sequentially.

14. A system, as set forth in claim 10, wherein the custom external device includes a multi-channel timing device for receiving the test signal from the analog bus, measuring the period of the test signal, and producing a frequency signal representative of the measured period.

* * * * *